United States Patent
Miserque et al.

(10) Patent No.: US 7,470,757 B2
(45) Date of Patent: Dec. 30, 2008

(54) OLEFIN POLYMERIZATION PROCESS IN THE PRESENCE OF AN ANTI-FOULING AGENT

(75) Inventors: Olivier Miserque, Mont-Saint-Guibert (BE); Daniel Siraux, Naast (BE); Philippe Bodart, Clermont sous Huy (BE)

(73) Assignee: Total Petrochemicals Research Feluy, Feluy (BE)

( * ) Notice: Subject to any disclaimer, the term of this patent is extended or adjusted under 35 U.S.C. 154(b) by 0 days.

(21) Appl. No.: 10/587,109

(22) PCT Filed: Feb. 8, 2005

(86) PCT No.: PCT/EP2005/050518

§ 371 (c)(1),
(2), (4) Date: Jan. 24, 2008

(87) PCT Pub. No.: WO2005/082954

PCT Pub. Date: Sep. 9, 2005

(65) Prior Publication Data

US 2008/0119622 A1    May 22, 2008

(30) Foreign Application Priority Data

Feb. 13, 2004 (EP) ................... 04100572

(51) Int. Cl.
C08F 4/69 (2006.01)
C08F 2/00 (2006.01)
C08F 10/02 (2006.01)

(52) U.S. Cl. ............... 526/74; 526/64; 526/106

(58) Field of Classification Search ............ 526/64, 526/74, 106

See application file for complete search history.

(56) References Cited

U.S. PATENT DOCUMENTS 3,248,179 A * 4/1966 Norwood .................... 422/132
5,929,179 A * 7/1999 Strobbe et al. ................ 526/64
2003/0114608 A1* 6/2003 Tharappel et al. ............. 526/64

OTHER PUBLICATIONS

Boulares et al., Preparation and structure of polyether-block containing polymers, Pure & Appl. Chem., vol. 70, No. 6, pp. 1239-1244, 1998.*

* cited by examiner

*Primary Examiner*—Fred M Teskin
(74) *Attorney, Agent, or Firm*—Diane L. Kilpatrick-Lee

(57) ABSTRACT

An olefin polymerisation process carried out in the presence of an anti-fouling agent and a chromium-type catalyst or Ziegler Natta catalyst; characterised in that the anti-fouling agent comprises an anti-fouling polymer having an average molecular weight (Mw) of greater than 1000 daltons and containing: (1) one or more blocks $-(CH_2-CH_2-O)_k-$ where each k is in the range from 1 to 50; and (2) one or more blocks $-(CH_2-CH(R)-(O)_n^-$ where R comprises an alkyl group having from 1 to 6 carbon atoms and each n is in the range from 1 to 50, and terminated by a R' and a R" end groups, wherein R' is OH or an alkoxy having from 1 to 6 carbon atoms and R" is H or an alkyl having from 1 to 6 carbon atoms.

16 Claims, 3 Drawing Sheets

OLEFIN POLYMERIZATION PROCESS IN THE PRESENCE OF AN ANTI-FOULING AGENT

The present invention concerns a new olefin polymerisation process for preventing fouling in the polymerisation reactor. The invention particularly concerns olefin polymerisation processes using chromium-oxide-type (so-called Phillips type) or a Ziegler Natta-type catalyst.

Olefin polymerisation processes are well known. Among the processes, slurry polymerisation in suspension in a solvent or in the liquid monomer is extensively practiced. Such processes are performed in a stirred tank reactor, or in closed loop reactors. One or more reactors can be used. In such processes, solid polymer particles are grown on small catalyst particles. Released heat of polymerisation is eliminated through cooling through the reactor's walls and/or a heat exchanger.

However, it has been found on an industrial scale that while the polymer particles are insoluble or substantially insoluble in the diluent, the polymer product has some tendency to deposit on the walls of the polymerisation reactor. This so-called "fouling" leads to a decrease in the efficiency of heat exchange between the reactor bulk and the coolant around the reactor. This leads in some cases to loss of reactor control due to overheating, or to reactor or downstream polymer processing equipment failure due to formation of agglomerates (ropes, chunks).

This "fouling" is caused in part by fines and also by the build up of electrostatic charge on the walls on the reactor. Attempts to avoid fouling during slurry polymerisation have been made by adding an antifouling agent in the polymerisation medium. Typically, the antifouling agent acts for example to make the medium more conductive, thus preventing to some extent the formation of electrostatic charge, which is one cause of the build-up of polymer on the wall of the reactor.

U.S. Pat. No. 3,995,097 discloses a process whereby an olefin is polymerised in a hydrocarbon diluent using a catalyst comprising chromium oxide associated with at least one of silica, alumina, zirconia, or thoria. Fouling of the reactor is said to be reduced by adding a composition, which comprises a mixture of aluminium or chromium salts of an alkyl salicylic acid and an alkaline metal alkyl sulphur succinate.

EP 0,005,215 is concerned with a process for polymerising olefins in a hydrocarbon diluent again using a catalyst comprising calcined chromium compound associated with at least one of silica, alumina, zirconia or thoria or using a catalyst system such as those disclosed in U.S. Pat. Nos. 2,908,671, 3,919,185 and 3,888,835. The process uses an anti-fouling agent comprising a compound containing a sulphonic acid residue. The anti-fouling agent is a composition comprising (a) a polysulphone copolymer (b) a polymeric polyamine, and (c) an oil soluble sulphonic acid. In the Example, the additive product known as Stadis 450 is used as the anti fouling agent.

U.S. Pat. No. 6,022,935 (equivalent to EP 0,803,514) discloses a process for the preparation of polymers of $C_2$-$C_{12}$ alk-1-ene using a catalyst system containing a metallocene complex. An antistatic agent is used in the process. It is said that in general, all antistatic agents which are suitable for polymerisations may be used. Examples given are salt mixtures comprising calcium salt s of medialanic acid and chromium salts of N-stearylanthranilic acid, $C_{12}$-$C_{22}$ fatty acid soaps of sulfonic esters of the general formula (RR')—CHOSO$_3$Me, esters of polyethylene glycols with fatty acids, and polyoxyethylene alkyl ethers.

EP 0,820,474 is concerned with preventing sheeting problems in gas phase reactors in polymerisation processes, which comprise at least one loop reactor followed by at least one gas phase reactor. These problems are addressed using a fouling preventive agent that is a mixture of Cr salt of $C_{14}$-$C_{18}$ alkylsalicylic acid, a Ca dialkyl sulphosuccinate and a copolymer of alkylmethacrylate with 2-methyl-5-vinylpyridine in solution in xylene. Chromium-type catalysts, Ziegler-type catalysts and metallocene catalysts are mentioned.

JP 2000-327,707 discloses a slurry olefin polymerisation method. The method addresses the problems of fouling and sheeting of the reactor wall, which is observed particularly with supported metallocene catalysts. The method is said to be carried out in the presence of one compound chosen from polyalkylene oxide alkyl ether, alkyl diethanolamine, polyoxyalkylene alkyl amine, and polyalkylene oxide block.

EP 1 316 566 discloses propylene polymerisation in a bulk loop reactor. The disclosure is concerned specifically with the transition from one catalyst type to another in a bulk loop reactor and with the problems associated therewith. The process involves injecting a metallocene catalyst and a Ziegler-Natta catalyst system into the bulk loop reactor. There is no disclosure in EP 1316566 of the catalyst being a chromium-oxide type catalyst. It is mentioned on page 3 paragraph [0009] that in one embodiment, a volume of antifouling agent may be introduced into a catalyst mixing system. Three possible antifouling agents are mentioned. The discussion on pages 10 and 11 clearly teach that an antifouling agent is used for the metallocene catalyst systems and not for conventional Ziegler-Natta catalyst systems. Further, the metallocene catalyst and Ziegler-Natta catalyst are injected into the loop reactor sequentially in EP 1 316 566 and not simultaneously so that they are not both present in the reactor at the same time and so that any antifouling agent present in the metallocene catalyst system will not contact the Ziegler-Natta catalyst system.

In view of the above, it will be seen that many so called anti-fouling agents for use in various olefin polymerisation processes are known. However, there have been some problems associated with prior known agents, particularly in relation to polymerisation processes using chromium-type catalysts and sometimes Ziegler-Natta type catalysts. These problems include an increase of catalyst consumption due to loss of activity in the presence of the anti-fouling agent. This can be observed even at the low levels typically used in the polymerisation process. Catalyst activity loss is linked to the poisoning of active sites, for example by the polar moieties of the anti-fouling agent (alcohol and sulphonate . . . ).

Other problems with prior known agents relate to problems of toxicity. This is a particular concern with Cr-based anti-fouling agent or with agents such as commercial Stadis 450 as described in EP 0,005,215, because of the solvent type (toluene) and/or because of the active ingredient.

Finally, practical problems are encountered with many previously known anti-fouling agents. These practical problems arise because some antifouling agents are usable only with a given catalyst type. This makes transitions between catalyst systems during processing more difficult.

Thus, there remains a need to provide new anti-fouling agents for use in olefin polymerisation processes using chromium-type catalysts, late Transition Metal-type catalysts, or Ziegler-Natta type catalysts without the drawbacks of current products.

This problem has been solved at least partially by the provision of an olefin polymerisation process carried out in the presence of an anti-fouling agent and a chromium-type catalyst, a late Transition Metal type catalyst, or Ziegler Natta catalyst; characterised in that the anti-fouling agent comprises an anti-fouling polymer having an average molecular weight (Mw) of greater than 1000 daltons and containing:

(1) one or more —$(CH_2—CH_2—O)_k$— where each k is in the range from 1 to 50; and
(2) one or more —$(CH_2—CH(R)—O)_n$— where R comprises an alkyl group having from 1 to 6 carbon atoms and each n is in the range from 1 to 50, and terminated by a R' and a R" end groups, wherein R' is OH or an alkoxy having from 1 to 6 carbon atoms an d R" is H or an alkyl having from 1 to 6 carbon atoms.

In the present process, $(CH_2CH(R)O)_n$ blocks generally may be considered to be lipophilic whereas $(CH_2CH_2O)k$ blocks may be considered to be hydrophilic. Preferably, one end of the polymer is hydrophilic and the other end or the middle of the polymer is lipophilic.

Such an anti-fouling agent is known per se, particularly outside the field of olefin polymerisation. In this regard, such an agent is known as a washing detergent.

However, it has been surprisingly found by the present inventors that such an agent may be used advantageously in an olefin polymerisation method which uses a chromium-type catalyst, a late Transition Metal-type catalyst, or Ziegler-Natta type catalyst. In particular it has been un expectedly found that improved activity of the catalyst occurs when this anti-fouling agent is used in a process, which uses a chromium-type catalyst, as compared with using other known anti fouling agents such as Stadis 450. In fact, up to twice the activity has been observed. This is especially unexpected because catalyst poisoning in presence of an anti-fouling agent is a particular problem with chromium-type catalysts because no scavenger such as a metal alkyl is used.

Furthermore, it has been found that no loss of activity occurs when this anti-fouling agent is used in a process, which uses a late Transition Metal-type catalyst or a Ziegler-Natta type catalyst. This is particularly advantageous since, for logistical reasons, it is preferable to be able to use a single anti-fouling agent in olefin polymerisation processes regardless of the type of catalyst (i.e. chromium-type, late Transition Metal-type, Ziegler-Natta type or metallocene. This is however not possible with most previously known anti-fouling agents, without loss of activity with one of the catalyst types.

Also, importantly, the rheology and mechanical properties of the resin product are not substantially modified when the present anti-fouling agent is used.

The present anti-fouling agent has the further advantage in that it is safer to humans than Cr-compounds or agents using an aromatic diluent, for example. This is in part because the present anti-fouling agent does not necessarily require a solvent, thereby avoiding the presence of for example toluene.

Preferably, the anti-fouling polymer is a block polymer, more preferably a triblock polymer.

Preferably, the antifouling polymer is a block polymer of general formula:

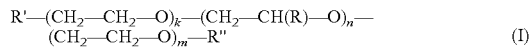

or

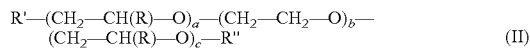

where R comprises an alkyl group; R' and R" are end groups; k is from 1 to 50; n is from 1 to 50; m is greater than or equal to 1; a is from 1 to 50; b is from 1 to 50; and c is from 0 to 50; k and m and a and c may be the same or different.

Preferably R is a C1 to C3 alkyl group. More preferably, R is a methyl group.

Preferably, in one embodiment, k is greater than 1 and m is greater than 1. Also preferably, in another embodiment a is 0 or c is 0.

Preferred R' and R" groups include H; OH; alkyl, and alkoxy groups. Preferred alkyl groups are C1 to C3 alkyl groups. Preferred alkoxy groups are C1 to C3 alkoxy groups. In this regard, as mentioned above, the ends of the polymer should be hydrophilic. Therefore, in formulae (I) and (II) above, it is preferred that R' is OH or an alkoxy group, preferably OH or a C1 to C3 alkoxy group. Further, it is preferred that R" is H or an alkyl group, preferably H or a C1 to C3 alkyl group.

A particularly preferred polymer has general formula (III):

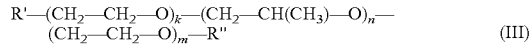 (III)

where R', R", k, n, and m independently are as defined anywhere above.

A further preferred polymer has general formula (IV):

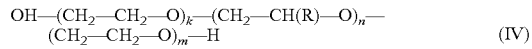 (IV)

where R, k, n, and m independently are as defined anywhere above.

It will be appreciated that, by virtue of the preferred molecular weights for the present anti-fouling polymer and the preferred ethylene oxide contents in the pre sent anti-fouling polymer given above, preferred values for a, b, c, k, n, and m can be derived.

It will be understood in the present process that, where necessary, an activating agent will be needed to activate the catalyst (e.g; Ziegler-Natta catalyst) or to modify the product polymer properties. Suitable activating agents, where needed, are well known in this art. Suitable activating agents include organometallic or hydride compounds of Group I to III, for example those of general formula $AlR_3$ such as $Et_3Al$, $Et_2AlCl$, and $(i-Bu)_3Al$. One preferred activating agent is triisobutylaluminium.

When the polymerisation process is a slurry polymerisation process, it is carried out in suspension in a liquid diluent. The diluent can be the liquid monomer or comonomer per se (e.g. propylene, hexene), or an inert liquid such as an alkane. Preferred alkane diluents include isobutane, propane, butane, pentane, hexane, isohexane, cyclohexane, and mixtures thereof.

The anti-fouling agent may be added at any suitable st age in the process. The addition can be carried out continuously or batch wise. The anti-fouling agent may be added to the polymerisation medium separately or may be mixed with the monomer or with the comonomer and then added to the polymerisation medium. Advantageously, the anti-fouling agent may be added via the monomer header in order to introduce the agent evenly in the reactor.

The anti-fouling agent desirably is liquid at room temperature and, as such, the anti-fouling polymer is liquid at room temperature. There are two principle factors which determine whether the anti-fouling polymer is liquid at room temperature. These are: the molecular weight of the anti-fouling polymer and the wt % ethylene oxide in the anti-fouling polymer.

Preferably, the wt % ethylene oxide in the anti-fouling polymer is in the range of from 5 to 40 wt %, more preferably from 8 to 30 wt %, even more preferably from 10 to 20 wt %, most preferably about 10 wt %.

Further, the anti-fouling polymer preferably has a molecular weight (MW), not higher than 5000. In order to avoid any poisoning effect on the catalyst and to minimise elution of residues from the formed polymer product, the molecular weight is greater than 1000 Daltons, preferably greater than 2000 Daltons, more preferably in the range from 2000-4500 Daltons.

It will be understood from the above that in order to ensure that the anti-fouling agent is liquid at room temperature, one must balance the molecular weight of the anti-fouling polymer and the wt % ethylene oxide in the anti-fouling polymer. It is to be noted that the activity of the anti-fouling polymer decreases as the molecular weight increases. Therefore, in practice, it may be desirable to increase the wt % ethylene oxide in the anti-fouling polymer in order to ensure that the anti-fouling agent is liquid at room temperature, rather than increase the molecular weight of the anti-fouling polymer.

It will be appreciated from the above that the molecular weight of the anti-fouling polymer should be selected in combination with the wt % ethylene oxide content in the anti-fouling polymer. For guidance value, the present inventors have found that an anti-fouling polymer having an ethylene oxide content of 10 wt % and a molecular weight in the range of from 4000 to 4500 is particularly useful in the present process.

Generally, the anti-fouling polymer is used at the lowest possible concentration effective to prevent or substantially reduce fouling. This can be determined by routine experimentation. Preferably it is used at a concentration of from 0.5 to 20 ppmw in the polymerisation medium, more preferably from 2 to 10 ppmw.

Preferably the present process may be used to make homopolymers of ethylene or copolymers or higher order polymers of ethylene and one or more comonomers. The copolymer or higher order polymer may be in a random, alternating, or block configuration. Preferred comonomers are alpha olefins including, for example, propylene, 1-butene, 1-hexene, 4-methyl 1-pentene, 1-octene. The process can further be used to make homopolymers or copolymers of other alpha olefins, for example propylene, butene and the like. It has been found that the present process is particularly effective when making high density polyethylene, although the process is not so limited.

Where the copolymer or higher order polymer is in a block configuration, one way of making the polymer is to make the homopolymer "blocks" and, subsequently, to introduce these pre-made "blocks" into the polymerisation medium with a comonomer. Alternatively, the "block" polymer can be made in a polymerisation medium containing the propylene monomer with a small quantity of the comonomer.

A preferred reaction temperature range may be said to be from 40° C. to 130° C., preferably from 50 to 120° C., more preferably from 70 to 110° C. for ethylene polymers.

A preferred applied pressure range may be said to be from 5 to 200 bars, more preferably from 30 to 70 barg, depending on the reactor configuration and on the diluent.

Generally, chromium-type catalysts usable in the present process comprise a chromium-oxide type catalyst, preferably chromium oxide associated with at least one of silica, alumina, titania, aluminophosphate or thoria. Such catalysts are well known in the art. Preferred chromium-oxide-type catalysts include Cr on silica, Cr on silica doped with titania, alumina, aluminophosphate, fluorine or mixtures thereof, and Cr on aluminophosphate.

Late transition metal catalysts usable in the present process include nickel complexes and iron complexes such as disclosed for example in Ittel et al. (S. T. Ittel, L. K. Johnson and M. Brookhart, in Chem. Rev., 2000, 1169.) and in Gibson and Spitzmesser (V. C. Gibson and S. K. Spitzmesser, in Chem. Rev., 2003, 283.). Catalysts of this type will be well known to a person skilled in this art.

Generally, Ziegler-Natta type catalysts usable in the present process comprise a transition metal compound of Group IV-VIII (mainly Ti, Zr or V) supported on a carrier. Such catalysts are well known in the art. Examples of Ziegler-Natta catalysts are $TiCl_4$, $TiCl_3$, $VCl_4$, $VOCl_3$. Titanium chloride supported on a $MgCl_2$ support or a $MgCl_2$/silica support are preferred.

One bulk reactor type which may be applied in slurry polymerisation processes is a turbulent flow reactor such as a continuous pipe reactor in the form of a loop. A continuous pipe reactor in the form of a loop is operated in liquid full mode, using liquid monomer or a diluent as the liquid medium. Such a so-called loop reactor is well known and is described in the Encyclopedia of Chemical Technology, $3^{rd}$ edition, vol. 16 page 390. This can produce LLDPE and HDPE resins in the same type of equipment.

A loop reactor may be connected to one or more further reactors, such as another loop reactor. A loop reactor that is connected to another loop reactor may be referred to as a "double loop" reactor.

Other types of bulk reactors such as stirred tank reactors may be used instead of a loop reactor, again using the bulk monomer or a diluent as the liquid medium. A stirred tank reactor also may be used in combination with a loop reactor, where a first reactor that is a loop reactor is connected to a second reactor that is a stirred tank reactor.

In some cases it may be advantageous for a gas phase reactor also to be incorporated. The gas phase reactor may be a second reactor that is connected to a first reactor such as a loop reactor or a stirred tank reactor. Alternatively, a gas phase reactor may be connected as a third reactor in the apparatus. In the gas phase reactor (if present), the elastomeric part of a copolymer or higher order polymer product may be produced. The elastomeric part of the polymer product gives impact properties to the product. The elastomeric part of the polymer product typically is comonomer rich.

The bulk reactor(s) may be connected to a gas phase reactor, for example where it is desirable to prepare a "block" polymer.

The present invention now will be described in further detail with reference to the attached drawings in which.

Figure 3:
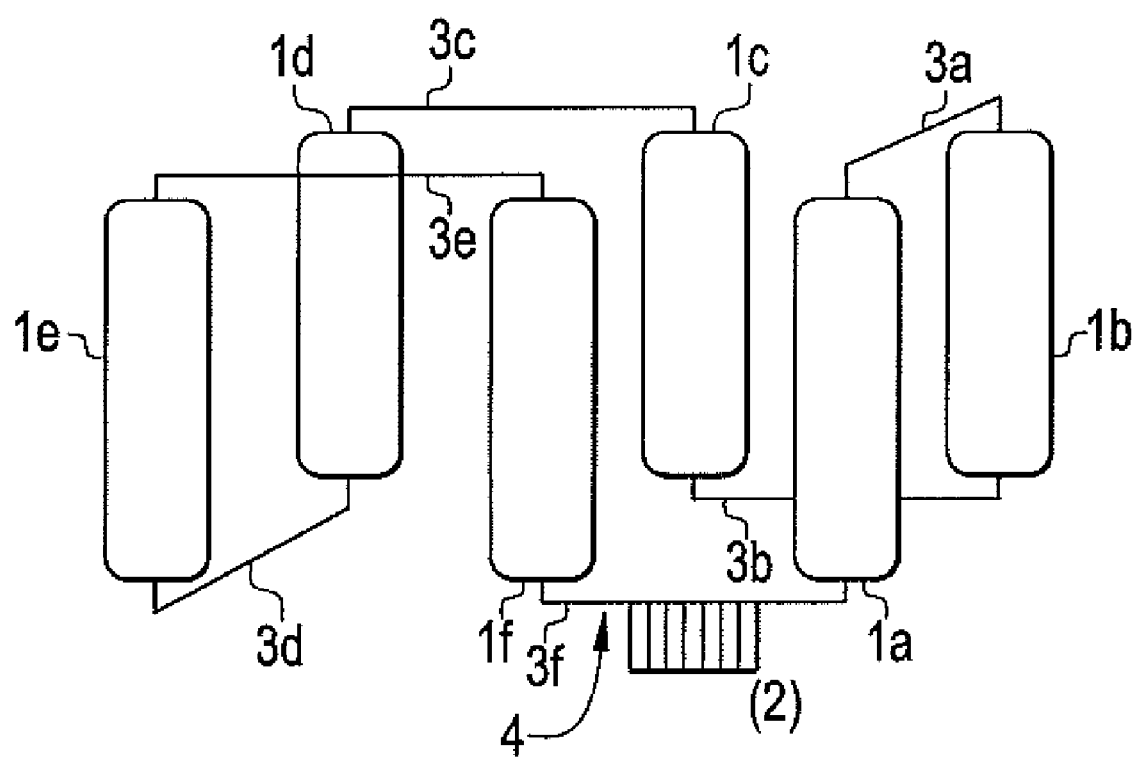
FIG. 3 shows a loop reactor usable in a process according to the present invention.

The following embodiment describes a loop reactor system:

A monomer (for example ethylene) polymerises in a liquid diluent (for example isobutane), hydrogen, catalyst, activating agent, anti-fouling agent, and optionally in the presence of a comonomer (for example hexene). A reactor essentially consists of four or more vertical jacketed pipe sections (1*a*, 1*b*, 1*c*, 1*d*, 1*e*, 1*f*) connected by trough elbows (3*a*, 3*b*, 3*c*, 3*d*, 3*e*, 3*f*), see FIG. 3 which shows a reactor with six vertical jacketed pipe sections. There are three lower trough elbows in the reactor in FIG. 3 (3*b*, 3*d*, 3*f*) and three upper trough elbows (3*a*, 3*c*, 3*e*). The slurry is maintained in circulation in the reactor by an axial pump (2). The polymerisation heat may be extracted by water cooling jackets around the vertical pipe sections (legs). The reactants, diluent and antifouling agent conveniently are introduced into one of the lower trough elbows of the reactor. Typically, the reactants, diluent and antifouling agent are introduced close to the circulating pump, for example in position "4", as shown in FIG. 3.

The product (for example polyethylene) may be taken out of one or more of the lower trough elbows of the reactor, with some diluent. Typically, the product is removed from a different trough elbow to the trough elbow into which the reactants, diluent and antifouling agent are introduced. For example, in FIG. 3, when the reactants, diluent and antifouling agent are introduced at position "4", the product could be removed from trough elbow 3*b* or 3*d*.

Slurry removal can be performed using a wash column or centrifuge apparatus.

Alternatively, slurry removal can be performed through settling legs and discontinuous discharge valves. In this discontinuous discharge system, a small fraction of the total circulating flow is withdrawn.

Alternatively, a continuous discharge system can be used.

If run in series, the product of the first loop reactor collected through the slurry removal system is reinjected in the second reactor with additional diluent and monomer. If required, additional antifouling agent can also be added to the second reactor. A concentration of the slurry between the reactors can sometimes be performed, e.g. through the use of hydro-cyclone systems.

If the slurry does not need to be transferred to another reactor, it is moved to a polymer degassing section in which the solid content is increased.

While being depressurised, the slurry is degassed, for example during transfer through heated flash lines to a flash tank. In the flash tank, the product and diluent are separated. The degassing is completed in a purge column. The powder product is then further additivated and processed into pellets or additivated powder.

EXPERIMENTS

I Comparison of Present Antifouling Agent with Stadis 450

Methods

Four resins (A-D) were produced using essentially two different anti-fouling agents, as follows:

Resin A: a bimodal resin produced using 2.2 ppm Stadis 450 (RTM) in IC4;

Resin B: a film resin produced using 2.4 ppm Stadis 450 (RTM) in IC4;

Resin C: a film resin produced using 1.1 ppm anti-fouling agent I (AFAI) in isobutene (IC4);

Resin D: a bimodal resin produced using 1.0 ppm anti-fouling agent I (AFAI) in IC4.

Anti-fouling agent I (AFAI) was in accordance with the present invention and had a formula:

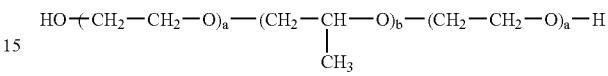

Anti-fouling Agent I had an OH value of 25.5 mg kOH/g, an approximate $M_w$ of 4400, and a 10% w/w ethylene oxide content.

The concentrations of anti-fouling agent I in IC4 and Stadis 450 (RTM) in IC4 were calculated so as to introduce the same amount of active compound into the reactor in each case. In this regard, Stadis 450 (RTM) contains about 50% toluene whereas anti-fouling agent I contained no solvent.

The anti-fouling agents (AF) were tested in a polymerisation reaction using a Cr on silica-titania catalyst (2.5% titania, 1% Cr, SA of about 500 m$^2$/g and pore volume of 2.5 ml/g.). Activation was performed in a fluidised bed, under air flow for 6 hours, at a given temperature. Complete details of the polymerisation process are provided in Tables 1 and 2 for each of resins A to D.

The reactor parameters and analysis are summarised in Table 1 below.

TABLE 1

| | Run | | Resin A Stadis | Resin D AFAI |
|---|---|---|---|---|
| reactor conditions | CATALYST | dumps/h | 60.5 | 26.5 |
| | TEMP. | ° C. | 96.5 | 97 |
| | ALKYL | ppm | 1.7 | 1.4 |
| | C2– | kg/h | 9.0 | 9.0 |
| | C6– | Kg/h | 0.170 | 0.108 |
| | IC4 | Kg/h | 24 | 24 |
| | AF | ppm | 2.2 | 1.0 |
| ANALYSIS OF EXITING GAS | C2– | wt % | 4.81 | 4.39 |
| | C6– | wt % | 0.27 | 0.24 |
| | C6–/C2– | | 0.057 | 0.054 |
| LOOP ANALYTICAL RESULTS | MI2 | g/10' | 0.077 | 0.060 |
| | HLMI | g/10' | 8.9 | 6.6 |
| | SR2 = HLMI/MI2 | | 116 | 110 |
| | DENSITY | g/cc | 0.9514 | 0.9501 |
| | Bulk Density (BD) | (g/cc) | 0.433 | 0.403 |
| ANALYSIS OF HOMOGENISED FLUFF | Productivity measured by X-ray fluorescence (Prod XRF) | g/g | 1005 | 2217 |
| | Activity, calculated from productivity (Activity XRF) | g/g/h/% C2 | 183 | 443 |
| | Waxes | % | 5.9 | 4.8 |
| | MI2 | g/10' | 0.088 | 0.0589 |
| | HLMI | g/10' | 10.2 | 6.9 |
| | SR2 = HLMI/MI2 | | 116 | 117 |
| | Density | g/cc | 0.9536 | 0.9508 |

Resins A and D were produced at the same reactor temperature, equivalent alkyl concentration and the same $C_2$ off-gas. In these experiments, the melt indices MI2 and HLMI were measured following the method of standard test ASTM D 1238 at a temperature of 190° C. and under a load of respectively 2.16 kg and 21.6 kg. The density was measured following the method of standard test ASTM D 1505 at a temperature of 23° C. and the bulk density Bd was measured following the method of standard test ASTM D 1895.

The antifouling agent I as compared to Stadis 450 (RTM) has a lower poisoning effect, gives higher catalyst productivity and generates lower melt index potential.

After fluff homogenising, a higher HLMI and density was measured for resin A.

Waxes content was equivalent for both resins A and D.

TABLE 2

| | Run | | Resin B Stadis | Resin C AFAI |
|---|---|---|---|---|
| reactor conditions | CATALYST | dumps/h | 35.3 | 36.9 |
| | TEMP. | ° C. | 90.5 | 90.5 |
| | ALKYL | ppm | 1.8 | 1.7 |
| | C2− | kg/h | 9.0 | 9.0 |
| | C6− | Kg/h | 0.983 | 1.044 |
| | IC4 | Kg/h | 24 | 24 |
| | AF | ppm | 2.4 | 1.1 |
| ANALYSIS OF EXITING GAS | C2− | wt % | 5.5 | 5.41 |
| | C6− | wt % | 1.98 | 2.09 |
| | C6−/C2− | | 0.368 | 0.391 |
| LOOP ANALYTICAL RESULTS | MI2 | g/10' | 0.158 | 0.155 |
| | HLMI | g/10' | 16.5 | 15.4 |
| | SR2 | | 108 | 101 |
| | DENSITY | g/cc | 0.9342 | 0.9348 |
| | Bulk Density (BD) | g/cc | 0.433 | 0.408 |
| ANALYSIS OF HOMOGENISED FLUFF | Prod XRF | g/g | 1463 | 1622 |
| | Activity XRF | g/g/h/% C2 | 233 | 263 |
| | Waxes | % | 24.4 | 27.5 |
| | MI2 | g/10' | 0.1488 | 0.1535 |
| | HLMI | g/10' | 14.7 | 15.5 |
| | SR2 | | 99 | 101 |
| | Density | g/cc | 0.9373 | 0.9376 |

Resins B and C were produced at the equivalent reactor conditions as shown in Table 2. No significant difference was observed between the anti-fouling agents in resins B and C in terms of properties and productivity, although approximately 10% higher productivity was achieved using anti-fouling agent I in resin C.

Resin Properties

Gel Permeation Chromatography (GPC) and Rheological Dynamic Analysis (RDA) were performed on all the resins.

Due to low productivity, the molecular weight distribution (MWD) of resin A is broad (see GPC results in Table 3), the weight average molecular weight (Mw) being equivalent. Taking into account the melt difference (8.8 g/10' with the anti-fouling agent in resin D and 14.3 with the anti-fouling agent in resin A) and the equivalent SR2, more long chain branching is generated with the anti-fouling agent in resin D and this is related to the higher catalyst productivity. All properties were measured on pellets.

TABLE 3

| Run | Units | Resin A Stadis | Resin D AFAI |
|---|---|---|---|
| Mn | | 11725 | 14363 |
| Mw | | 216965 | 213259 |

TABLE 3-continued

| Run | Units | Resin A Stadis | Resin D AFAI |
|---|---|---|---|
| Mz | | 2481877 | 1743835 |
| D = Mw/Mn | | 18.5 | 14.8 |
| D' = Mz/Mw | | 11.4 | 8.2 |
| HLMI | g/10' | 14.3 | 8.8 |
| Wc (COP-RDA) | rad/s | 0.71 | 0.373 |
| Gc (COP-RDA) | Pa · s | 13690 | 12590 |

Figure 1:
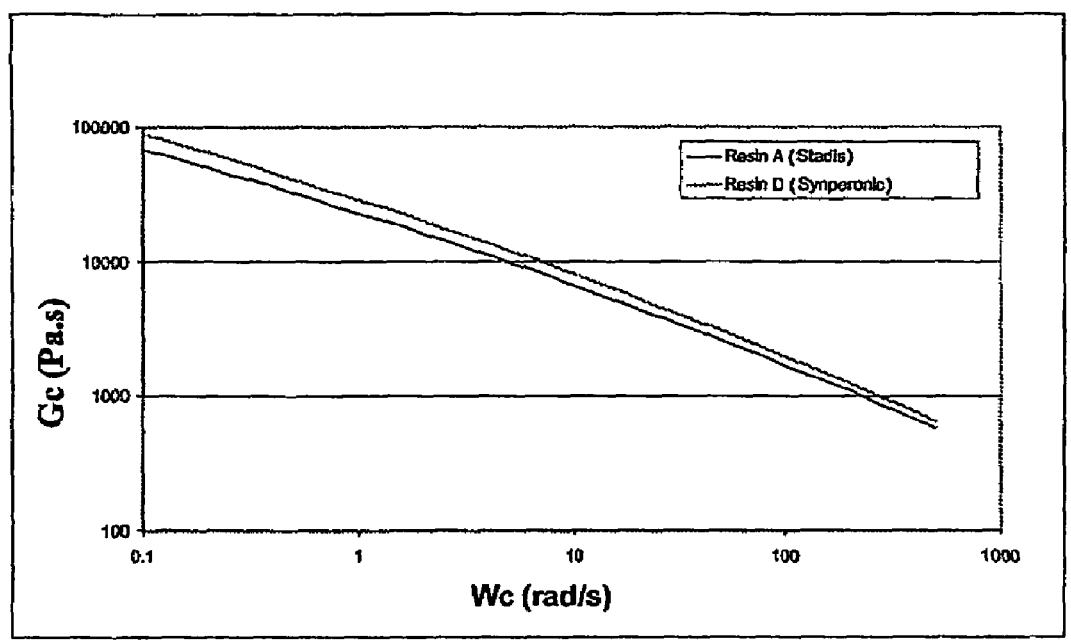
FIG. 1 shows the results of rheological dynamic analysis (RDA), Gc expressed in Pa·s as a function of Wc expressed in rad/s performed on resins A and D.
Figure 2:
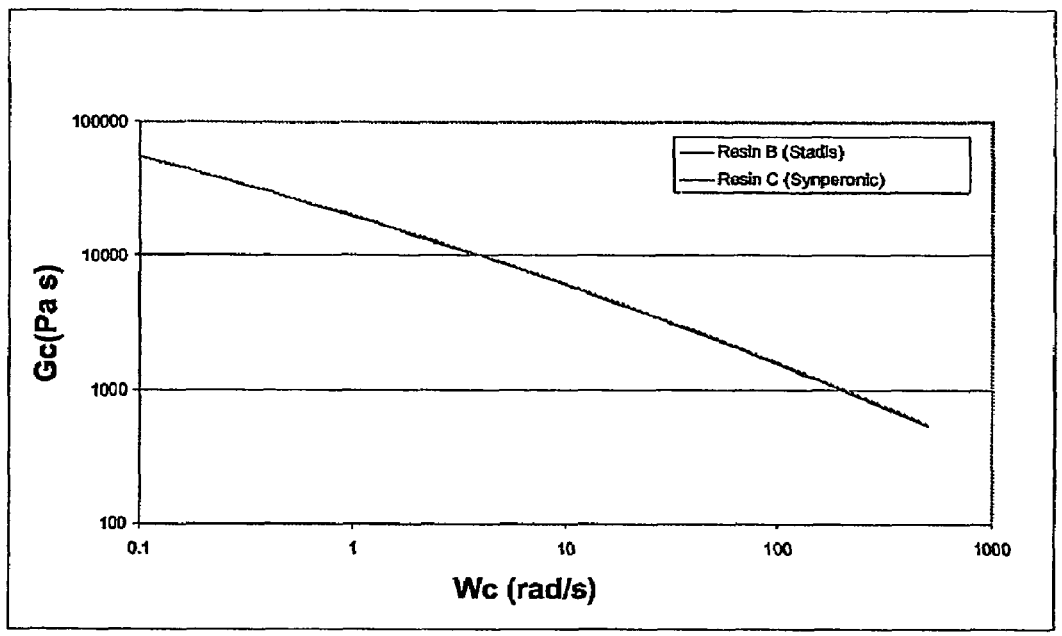
FIG. 2 shows the results of RDA Gc expressed in Pa·s as a function of Wc expressed in rad/s performed on resins B and C

Mn, Mw and Mz represent respectively the number average molecular weight, the weight average molecular weight and the z average molecular weight. RDA results confirm that the Melt Index of resin A is too high and that resin D contains more long chain branching and/or has a narrower MWD (see FIG. 1) GPC and RDA curves show that film resins B and C are equivalent (see Table 4 and FIG. 2). MWD are broad for both resins indicating low productivity.

TABLE 4

| Run | Units | Resin B Stadis | Resin C AFAI |
|---|---|---|---|
| Mn | | 13059 | 13471 |
| Mw | | 201926 | 282173 |
| Mz | | 2119213 | 4998934 |
| D = Mw/Mn | | 15.5 | 20.9 |
| D' = Mz/Mw | | 10.5 | 17.7 |
| MI2 | g/10' | 0.12 | 0.12 |
| HLMI | g/10' | 15.6 | 15.4 |
| SR2 | | 130 | 128 |
| density | | 0.9372 | 0.9370 |
| Wc (COP-RDA) | rad/s | 2.1 | 2.2 |
| Gc (COP-RDA) | Pa · s | 20240 | 20960 |

Mechanical Properties

ESCR and antioxydant (AO) tests were performed on resins A and D (See Table 5) on homogenised fluff and on pellets. Worse product resistance was observed with resin A due to the higher density. Some fractures are also obtained with resin A at 100% Antarox (the average fracture time for the samples is still of 703 hours).

TABLE 5

| | | units | Resin A Stadis | Resin D AFAI |
|---|---|---|---|---|
| Homogenised Fluff | MI2 | g/10' | 0.088 | 0.0589 |
| | HLMI | g/10' | 10.2 | 6.9 |
| | SR2 | | 116 | 117 |
| | Density | g/cc | 0.9536 | 0.9508 |
| Pellets | HLMI | g/10' | 14.3 | 8.8 |
| | SR2 | | | |
| | density | g/cc | | |
| | ESCR F50 | hr | >700 | >700 |

The ESCR was measured following the method of standard test ASTM D 1690. The tests were performed on 10 samples of each resin: 6 samples had an average ESCR of slightly above 700 hr and 4 samples had an average ESCR of over 1250 hr.

What is claimed is:

1. An olefin polymerization process comprising:
   a) providing a chromium-based polymerization catalyst;
   b) contacting said catalyst with an alpha olefin in a polymerization reactor under polymerization conditions with an anti-fouling polymer having an average molecular weight greater than 1,000 daltons and having
      i) at least one polymer block characterized by the formula —($CH_2$—$CH_2$—O)$_k$-wherein k is within the range of 1-50; and
      ii) at least one polymer block characterized by the formula —($CH_2$—CH(R)—O)$_n$-wherein R comprises an alkyl group having from 1-6 carbon atoms and n is within the range of 1-50;
   wherein said copolymer is terminated by end groups R' and R", R' is OH or a $C_1$-$C_6$ alkoxy group and R" is H or a $C_1$-$C_6$ alkyl group; and
   c) recovering an olefin polymer from said reaction zone.

2. The process of claim 1 wherein R is a methyl group.

3. The process of claim 1 wherein said anti-fouling polymer is liquid at room temperature.

4. The process of claim 3 wherein said anti-fouling polymer has a molecular weight of at least about 2,000 daltons.

5. The process of claim 4 wherein said anti-fouling polymer has a molecular weight of no more than 5,000 daltons.

6. The process of claim 4 wherein said anti-fouling polymer has a molecular weight within the range of 2,000-4,500 daltons.

7. The process of claim 1 wherein the ends of said anti-fouling polymer are hydrophilic.

8. The process of claim 1 wherein said anti-fouling polymer comprises a block copolymer characterized by formula (I) or (II):

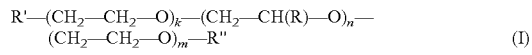
$$R'—(CH_2—CH_2—O)_k—(CH_2—CH(R)—O)_n—(CH_2—CH_2—O)_m—R'' \quad (I)$$

or

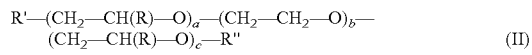
$$R'—(CH_2—CH(R)—O)_a—(CH_2—CH_2—O)_b—(CH_2—CH(R)—O)_c—R'' \quad (II)$$

wherein R comprises an alkyl group; R' and R" are end groups as defined in claim 1; k is from 1 to 50; n is from 1 to 50; m≧1; a is from 1 to 50; b is from 1 to 50; and c is from 0 to 50.

9. The process of claim 8 wherein said anti-fouling polymer comprises a block copolymer characterized by formula (III):

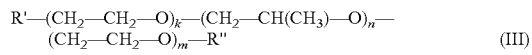
$$R'—(CH_2—CH_2—O)_k—(CH_2—CH(CH_3)—O)_n—(CH_2—CH_2—O)_m—R'' \quad (III)$$

wherein R', R", k, n, and m independently are as defined in claim 8.

10. The process of claim 8 wherein the anti-fouling polymer comprises a block copolymer characterized by the general formula (V):

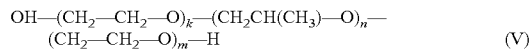
$$OH—(CH_2—CH_2—O)_k—(CH_2CH(CH_3)—O)_n—(CH_2—CH_2—O)_m—H \quad (V)$$

where k, n, and m independently are as defined in claim 8.

11. The process of claim 1 wherein said reactor comprises a loop reactor.

12. The process of claim 11 wherein said reactor comprises a double loop reactor.

13. The process of claim 1 wherein said polymerization reactor is operated at a temperature within the range from 40° to 130° C.

14. The process of claim 13 wherein said reactor is operated at a pressure within the range of from 5 to 200 bars.

15. The process of claim 1 wherein said polymer comprises an alpha olefin homopolymer or copolymer.

16. The process of claim 15 wherein said polymer is a homopolymer of ethylene or a copolymer of ethylene and at least one $C_3$+alpha olefin.

* * * * *